United States Patent
Shinde et al.

(10) Patent No.: US 10,067,632 B2
(45) Date of Patent: *Sep. 4, 2018

(54) DYNAMIC HOVER GRACE PERIOD

(71) Applicant: International Business Machines Corporation, Armonk, NY (US)

(72) Inventors: Nitu M. Shinde, Livermore, CA (US); Martine B. Wedlake, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 14/835,095

(22) Filed: Aug. 25, 2015

(65) Prior Publication Data
US 2015/0378553 A1 Dec. 31, 2015

Related U.S. Application Data

(63) Continuation of application No. 14/259,128, filed on Apr. 22, 2014.

(51) Int. Cl.
*G06F 3/0484* (2013.01)
*G06F 3/0481* (2013.01)
*G06F 3/048* (2013.01)

(52) U.S. Cl.
CPC .......... *G06F 3/04812* (2013.01); *G06F 3/048* (2013.01); *G06F 3/0484* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 6,542,164 B2 * | 4/2003 | Graham | G06F 3/04812 345/157 |
| 7,107,530 B2 | 9/2006 | Blakely et al. | |
| 7,167,255 B1 | 1/2007 | Mikami et al. | |
| 7,454,712 B2 | 11/2008 | Schultz | |
| 7,490,299 B2 | 2/2009 | Karstens | |
| 2002/0054013 A1 * | 5/2002 | Graham | G06F 3/04812 345/156 |
| 2004/0109030 A1 * | 6/2004 | Farrington | G06F 9/4446 715/808 |
| 2004/0150712 A1 * | 8/2004 | Le Pennec | H04N 7/152 348/14.01 |
| 2006/0022955 A1 * | 2/2006 | Kennedy | G06F 3/0414 345/173 |

(Continued)

OTHER PUBLICATIONS

List of IBM Patents or Patent Applications Treated as Related.

*Primary Examiner* — Taghi T Arani
*Assistant Examiner* — F J Farhadian
(74) *Attorney, Agent, or Firm* — ZIP Group PLLC

(57) ABSTRACT

A hover section is displayed upon a GUI following the lapse of a hover grace period interval that is dynamically adjusted. A default hover grace period interval is set and increasing if a hover display module determines manipulations of the GUI indicate the hover section was displayed in error and is decreased if the hover display module receives a decrease hover grace period interval event. By dynamically adjusting the grace period interval, future hover sections may be displayed to better reflect the GUI user's intent.

7 Claims, 6 Drawing Sheets

(56) References Cited

U.S. PATENT DOCUMENTS

| | | | |
|---|---|---|---|
| 2006/0139312 A1* | 6/2006 | Sinclair, II | G06F 3/0481 |
| | | | 345/156 |
| 2007/0198950 A1* | 8/2007 | Dodge | G06F 3/0481 |
| | | | 715/815 |
| 2007/0204239 A1* | 8/2007 | Ray | G06F 3/04812 |
| | | | 715/856 |
| 2010/0185979 A1* | 7/2010 | Shores | G06F 3/0481 |
| | | | 715/809 |
| 2012/0017182 A1* | 1/2012 | Bau | G06F 3/04812 |
| | | | 715/859 |
| 2012/0079414 A1* | 3/2012 | Eischeid | G06F 3/0481 |
| | | | 715/781 |
| 2012/0108321 A1* | 5/2012 | Radek | G07F 17/3216 |
| | | | 463/25 |
| 2013/0207892 A1* | 8/2013 | Kim | G06F 3/033 |
| | | | 345/157 |
| 2013/0311908 A1* | 11/2013 | Ray | G06F 3/04812 |
| | | | 715/760 |
| 2015/0195371 A1* | 7/2015 | Nowakowski | G06F 3/04812 |
| | | | 709/213 |
| 2015/0378553 A1* | 12/2015 | Shinde | G06F 3/04842 |
| | | | 715/762 |

* cited by examiner

DYNAMIC HOVER GRACE PERIOD

FIELD OF THE INVENTION

Embodiments of present invention generally relate to the field of graphical user interfaces and, more specifically, relate to a system to allow for a graphical user interface implementing a dynamic hover grace period.

DESCRIPTION OF THE RELATED ART

A graphical user interface (GUI) is an interface that allows users to interact with electronic devices. The use of GUIs is widespread. For example, GUIs are used in computers, tablet computers, mobile phones, portable media players, gaming devices, household appliances, cash machines, and office equipment to display various software applications. Software applications may include images and text that may be displayed via GUIs.

A hover section is an area of a GUI that is displayed when the user moves or "hovers" the pointer over a particular anchor object. The technique is particularly common in web browsers where the hover section is displayed on top of primary web page content. The hover section may display extra, ancillary, additional, etc. information or actions related to the anchor object. Hover sections are useful to normally hide infrequently utilized information or actions associated with the anchor object while allowing for efficient access.

Often a GUI may implement numerous anchor objects. Associated hover sections may be undesirably displayed when the pointer traverses the GUI, thereby obscuring portions of the GUI that lay underneath the displayed hover section. For example, a frequently utilized icon may be obscured by a hover section because the pointer traversed the associated anchor object along a path to the icon. The undesired display of hover sections is invasive to the GUI user's experience.

SUMMARY

In an embodiment of the present invention, a method for dynamically adjusting a hover grace period interval wherein a hover section is displayed upon a GUI following the lapse of the hover grace period interval is disclosed. The method includes setting, with a processor, a default hover grace period interval, increasing, with a processor, the hover grace period interval from the default hover grace period interval if a hover display module determines manipulations of the GUI indicate the hover section was displayed in error, and decreasing, with a processor, the hover grace period interval if the hover display module receives a decrease hover grace period interval event.

This and other embodiments, features, aspects, and advantages will become better understood with reference to the following description, appended claims, and accompanying drawings.

DETAILED DESCRIPTION

Figure 1:
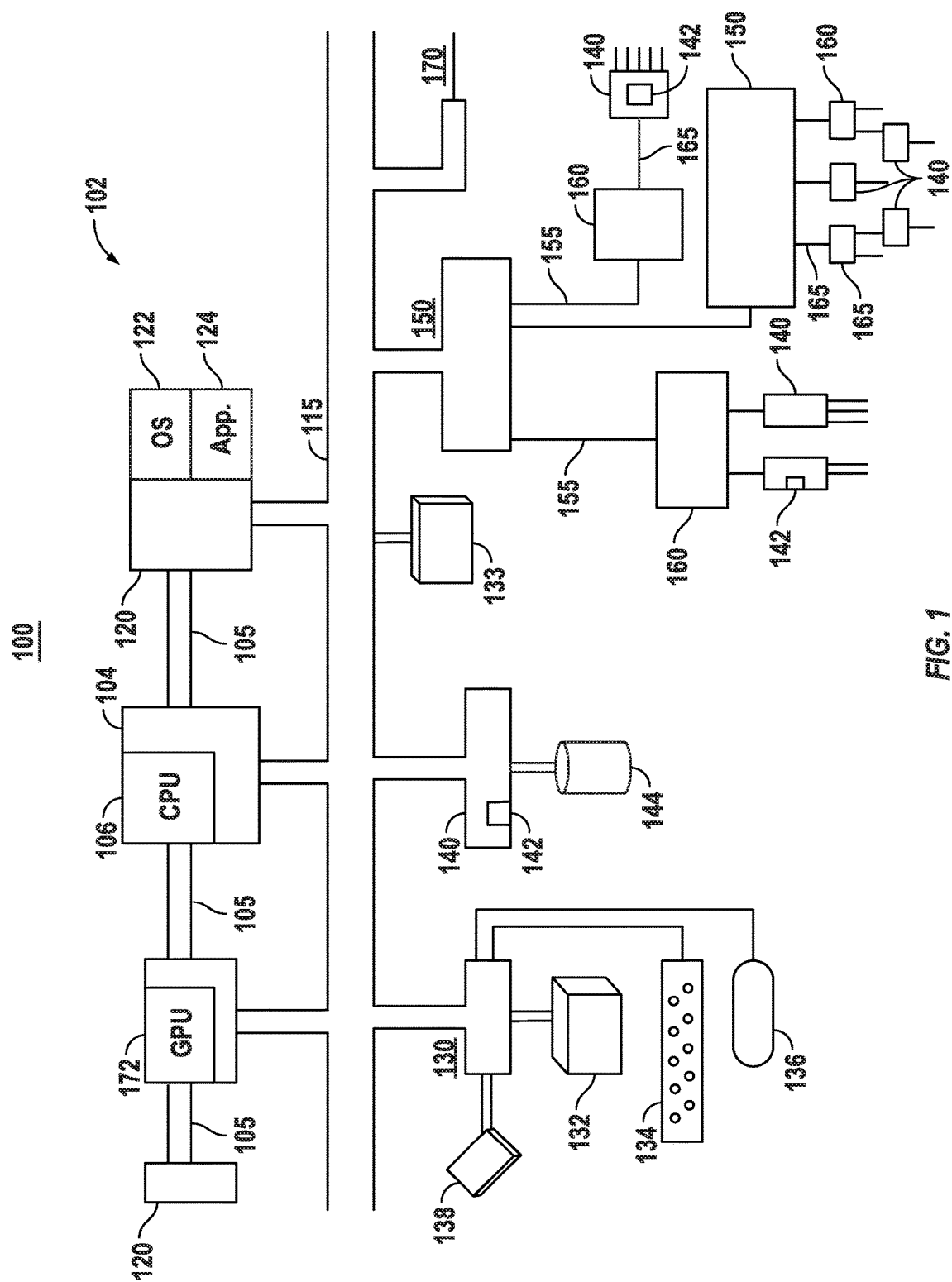
FIG. 1 illustrates components and an interconnection topology for an information handling system that may utilize or enable one or more embodiments the present invention.

FIG. 1 illustrates components and an interconnection topology for an information handling system, for example a computer system 100 that may utilize or enable one or more embodiments the present invention. Computer system 100 may comprise a host 102 having a host processor complex 104 connected to a memory 120 by an internal bus 105 and/or a host system bus 115. In certain embodiments, host 102 may also include a graphics processor complex 170 connected to memory 120 by the internal bus 105 and/or the host system bus 115. In various embodiments, graphics processor complex 170 may be included in or may be distinct from host processor complex 104.

The host processor complex 104 has at least one general-purpose programmable processor unit (CPU) 106 that may execute program instructions stored in main memory 120. Although a single CPU 106 is shown in FIG. 1, it should be understood that a processor complex 104 may have multiple CPUs 106. Host processor complex 104 also has at least one general-purpose programmable graphics processor unit (GPU) 172 that builds images (e.g. a GUI) for output to a display 132. CPU 106 working in conjunction with applications 124 sends information about an image to GPU 172. GPU 172 determines how to manipulate pixels on e.g. display 132 or touch screen 133 to create the image or user interface. Ultimately, GPU 172 communicates that information to display 132 or touch screen 133 and the image (e.g. GUI, etc.) is displayed to a user. CPU 106 and GPU 172 may be discrete components as shown in FIG. 1 or may be integrated into a single component.

Memory 120 or a portion of memory 120 may be included within the host processor complex 104 and/or graphics processor complex 170 or connected to it via an internal bus system 105 or via a host system bus 115. Memory 120 may be for example a random access memory for storing data and/or program instructions. Though memory 120 is shown conceptually as a single monolithic entity, memory 120 may be arranged as a hierarchy of caches and other memory devices. In some instances, a hierarchy of cache memories is associated with each CPU 106 and/or GPU 172. Memory 120 may include an operating system (OS) 122 and applications 124. Operating system 122 may provide functions such as device drivers or interfaces, management of memory pages, management of multiple tasks, etc., as is known in the art. Applications 124 may be programs, procedures, algorithms, routines, instructions, software, etc. that directs what tasks computer system 100 should accomplish and instructs how computer system 100 should accomplish those tasks. For example, an application 124 may for example utilize input data generated from input devices to determine if and when a hover section should be displayed via the GPU.

Host system bus 115 may support the transfer of data, commands, and other information between the host processor system 102 and other internal, peripheral, or external devices attached to it. Host system bus 115 may also support the communication of data between external devices independent of the host processor complex 102. While shown in simplified form as a single bus, the host system bus 115 may be structured as multiple buses which may be for example hierarchically arranged. Host system bus 115 may be connected to other internal host 102 components (such as a touch screen display 133, display 132, etc.) and/or to a myriad of external or peripheral devices through a connection hub 130, through an adapter 140, a multifunction adapter 150, or directly to a network 170.

In exemplary embodiments, the computer system 100 may be a mobile device that comprises one or more input devices, display 132, memory 120, etc. Input device(s) may be any system and/or device capable of receiving input from a user. Examples of input devices include, but are not limited to, a mouse or handheld device 136, a key board 134, a print scanner 138, a microphone, a touch screen 133, and the like input devices. In the various embodiments, each input device may be in communication with display 132. In one embodiment, display 132 includes touch screen 133 such that display 132 and the input device are integrated devices. In various embodiments, display 132 is configured to display an image generated by GPU 172 that received data from one or more input device(s). Further input devices may be any system and/or device capable of capturing environmental inputs (e.g., visual inputs, audio inputs, and tactile inputs). Examples of capture devices include, but are not limited to, a camera, a microphone, a global positioning system (GPS), a gyroscope, a plurality of accelerometers, etc.

Display 132 may be a cathode-ray tube display, a flat panel display, or other display technology. One or more adapters 140 may support keyboard 134 and mouse 136; it being understood that other forms of input devices could be used. The number and types of devices shown in FIG. 1 are illustrative only and ordinary users of computer systems now know that a great variety of connected devices exist; e.g., microphones, speakers, infrared remote controls, wireless connected devices, etc. and therefore computer system 100 is not limited to those devices illustrated in FIG. 1.

The host system bus 115 may also be connected to an adapter 140. Adapter 140 is an expansion device that may expand the functionalities of computer system 100. For example, adapter 140 may be an input output (I/O) adapter connected to an external memory device 144, a graphics adapter including graphics processing complex 170 that is connected to an external display 132, etc. External memory device 144 may be rotating magnetic disk storage, rotating or static optical drives, magnetic tape storage, FLASH memory, etc. Adapter 140 may include adapter microcode or firmware and decision logic which may be embodied as a message processor 142. The adapter 140 may also be provided with at least one fast nonvolatile write cache, queues, interrupt registers connected to the message processor 142 and/or decision logic. The message processor 142 may process incoming messages from the host processor complex 102 and generate and transmit response messages back to the host processor complex 102. The host system bus 115 may also be connected to a multifunction adapter 150 to which more I/O devices may be connected either directly, or through one or more bridge devices 160, or through another multifunction adapter 150 on either a primary bus 155 or a secondary bus 165.

Network interface 170 provides an operative connection for transmission of data to and from a network. The network may be an internet but could also be any smaller self-contained network such as an intranet, a WAN, a LAN, or other internal or external network using; e.g., telephone transmission lines, cable services, satellites, fiber optics, T1 lines, wireless, etc., and any other various technologies.

Computer system 100 need not be a computer at all, but may be a simpler device such as a network terminal, a thin client, a terminal-like device, a voice response unit, etc. The convergence of computing, telecommunications and consumer electronics is causing a tremendous growth in the number and variety of pervasive mobile devices as clients. This mobile architecture enables the multitude of client devices including laptops, sub-notebooks, handheld computers such as personal digital assistants and companion devices, and mobile appliances such as smart phones, pagers, simple messaging devices and wearable devices. Thus when the computer system 100 is a mobile device, adapters 140 and network interfaces 170 may support a variety of multi-modal interfaces input device interfaces such as those for keyboard 134 mouse 134, small text screens, pen, touch screens 133, speech recognition, text-to-speech, and/or wearable devices.

In certain embodiments some or all of the devices shown and described in FIG. 1 may be included in a discrete computer system 100 (e.g. touch screen display 133, memory device 144, etc. are included within computer system 100, etc.). In other embodiments some of the devices shown and described in FIG. 1 may be separate, peripheral, or external to computer system 100 (e.g. multiple modular computer systems 100 may share a single large database, external display 132 is peripherally connected to computer system 100, etc.). Further, the devices shown and described in FIG. 1 may each include hardware and/or software device drivers, interfaces, registers, buffers, or the like to allow for effective communication between devices.

The computer system shown in FIG. 1 is intended to be a simplified representation, it being understood that many variations in system configuration are possible in addition to those specifically mentioned here. For instance, though computer system 100 may be a portable device as described above, computer system 100 may also be a larger computer system such as a general purpose server.

Various embodiments of the present invention pertain to methods that may be implemented upon or by computer system 100. When computer system 100 performs particular tasks according to one or more methods described herein as is directed by at least one application 124, such computer system 100 becomes a special purpose computer particular to those one or more methods.

Figure 2:
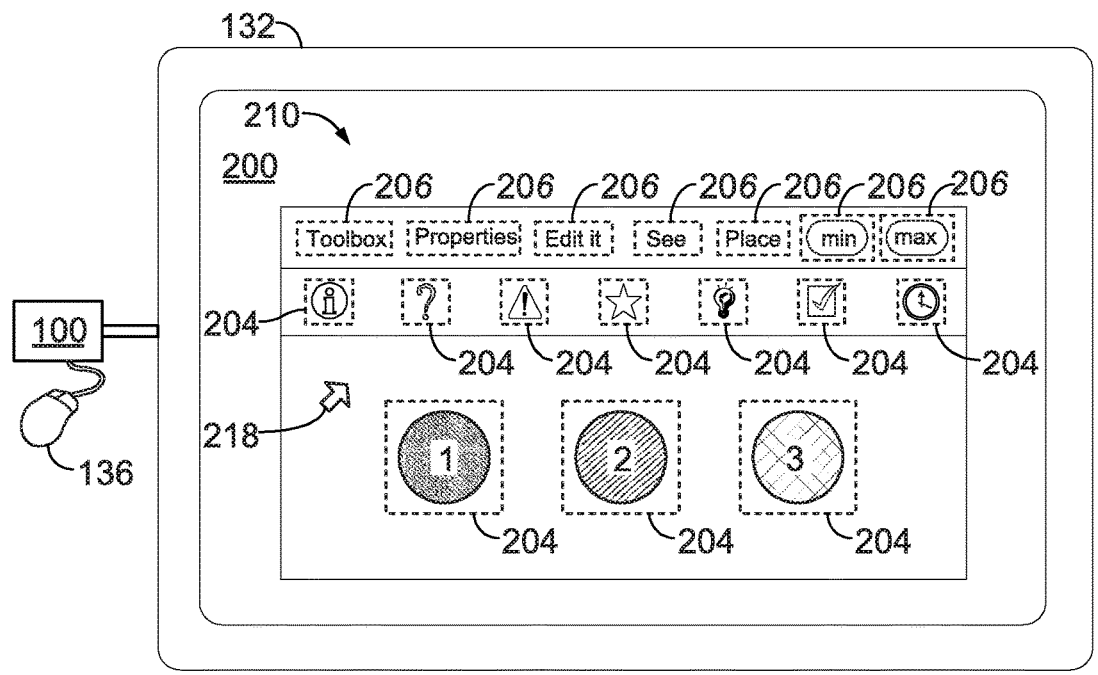
FIG. 2 and FIG. 3 illustrate exemplary GUI types according to embodiments of the present invention.
Figure 3:
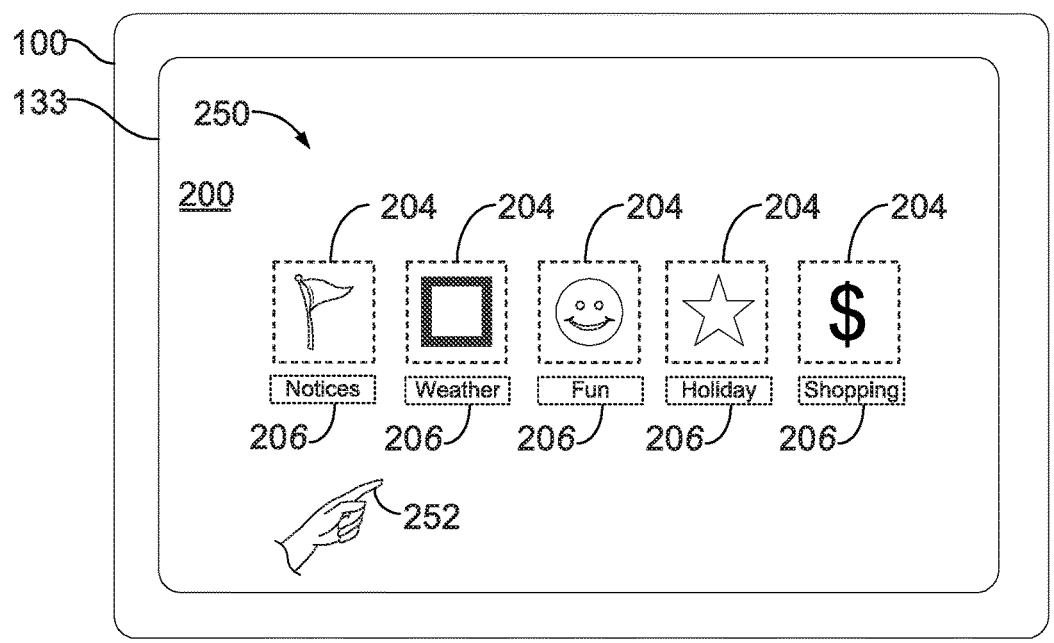

FIG. 2 and FIG. 3 illustrate exemplary GUIs 200 that may be displayed upon e.g. display 132, touch screen 133, etc., according to various embodiments of the present invention. GUI 200 may be generated by e.g. CPU 106 and/or GPU 172 working in conjunction with applications 124. GUI 200 provides a graphical interface that is displayed upon, for example, display 132, touch screen display 133, etc. The user may interact with GUI 200 to e.g. manage computer system 100, to manage one or more devices in computer system 100, to manage, control, develop, create, utilize etc. one or more applications 124, manage one or more devices connected to computer system 100, etc., it being understood that GUI 200 may be utilized to accomplish many other tasks upon computer system 100.

GUI 200 may visually present actions available to the user enabling user to interact with computer system 100. The user may interact via GUI 200 in a variety of ways, but generally the user interacts with GUI 200 by engaging image objects 204, textual objects 206, etc. How a user engages a image object 204 depends upon, for example, the particular image object 204, hierarchies, associations, or relationships that exist between multiple image objects 204, rules as defined by an application 124 associated with image objects 204, etc.

As shown in FIG. 2, GUI 200 may be a WIMP interface 210 (window, icon, menu, pointing device). When using a WIMP interface 210, the user utilizes, for example, the mouse or other handheld device 136 to control the position of cursor 218. In certain embodiments, the WIMP interface 210 presents information in a window and an icon based environment. The user may engage a particular image object 204 or text object 206 by maneuvering the device 136 to manipulate cursor 218 to the particular object (e.g. "hover", etc.). The user may further engage the device 136 (e.g. click, double click, etc.), etc.

As shown in FIG. 3, GUI 200 may be a gesture interface 250. Using gesture interface 250, the user may interact with computer system 100 by making gestures with one or more fingers 252 in contact with touch screen display 133. Exemplary gestures are pointing, pinching, flicking, rotating, etc. More generally, the user may engage a particular image object 204 or text object 206 by utilizing gesture interface 250 to engage with the particular image object 204 or text object 206. Gesture interface 250 may be beneficial when computer system 100 is a smaller mobile device such as a tablet, PDA, or smart phone, due to screen size constraints.

Applications 124 may display a GUI 200 having one or more image objects 204 and one or more text objects 206. GUIs 200 may include numerous views or pages that may include similar image objects 204 or text objects 206 relative to other pages. As such, typically there are numerous different image objects 204 and text objects 204 that the particular application 124 displays utilizing GUI 200 via the GPU 172.

Figure 4:
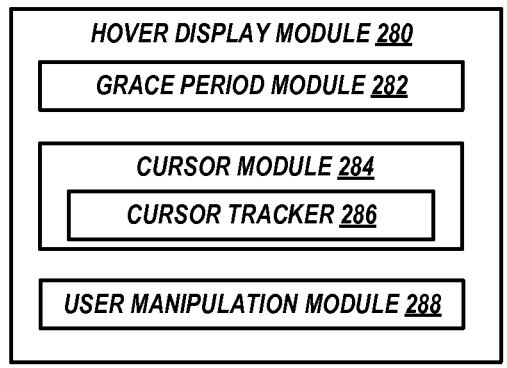
FIG. 4 illustrates exemplary hover application components according to embodiments of the present invention.

FIG. 4 illustrates exemplary hover components 290 according to embodiments of the present invention. In certain embodiments, one or more hover components 290 are embodied within CPU 106, within GPU 172. In certain embodiments, one or more hover components 290 are embodied within a programmable device such as a field programmable gate array, erasable read only programmable memory, etc. communicatively connected to CPU 106 and/or GPU 172 via e.g. bus 115. Still in other embodiments functionality of hover components 290 may be carried out by one or more applications 124 invoked by CPU 106 and/or GPU 172.

Hover display module 280 manages or otherwise controls the display of a particular hover section via GUI 200. Hover display module 280 may include a grace period module 282, a cursor module 284, a user manipulation module 288, etc. Grace period module 282 manages or otherwise controls a grace period interval. The grace period interval is a timed delay of the display of a hover section after a hover is triggered. In accordance with various embodiments further described herein, the grace period may be dynamically adjusted or otherwise managed by grace period module 282. In accordance with various embodiments of the present invention, a hover section may be for example a tooltip (in case of a webpage GUI), a display object, an image object 204 displayed over primary GUI 200 content, a text object 206 displayed over primary GUI 200 content, etc.

Cursor module 284 controls the position of cursor 218 upon GUI 200. Cursor module 284 receives data from one or more input devices (e.g. mouse or handheld device 136, etc.) and processes that data to position of cursor 218 upon GUI 200 as applicable. For example, if a user moves device 136 to the left, cursor module receives associated data, processes that data and via CPU 106 and/or GPU 172 displays cursor 218 moving to the left within GUI 200. In certain embodiments cursor module 284 includes a cursor tracker 286 that tracks cursor 218 movements. For example, cursor tracker 286 may determine cursor 218 velocity, acceleration, history (e.g. cursor 218 way points along a traversal path, user manipulation pattern, etc.), etc.

User manipulation module 288 manages or controls user engagement of one or more input devices. A user may engage device 136 (e.g. click, double click, etc.). User manipulation module 288 receives engagement data and processes that data and via CPU 106 and/or GPU 172 displays an associated action upon GUI 200. For example, the user may desire to delete or remove a particular image object 204 within GUI 200. The user may position cursor 218 over a delete icon (an "x", etc.) and engage the associated input device. User manipulation module 288 receives data that the user engaged the delete feature of a particular image object 204 and instructs via CPU 106 and/or GPU 172 to no longer display that image object 204 upon GUI 200.

In certain embodiments, hover display module 280 is located within computer system 100 to display a GUI 200 upon computer system 100. For instance, GUI 200 is a interface to an application 124 stored in memory 120. In other embodiments, hover display module 280 is located outside of computer system 100 (e.g. upon a server) to display a GUI 200 upon computer system 100. For instance, GUI 200 is an interface to a hosted application 124 stored upon the server (e.g. a web application, etc.). In other embodiments, one or more modules of hover display module 280 may be included local to computer system 100 and one or more modules of hover display module 280 may be local to the e.g. server communicatively connected to computer system 100.

Figure 5:
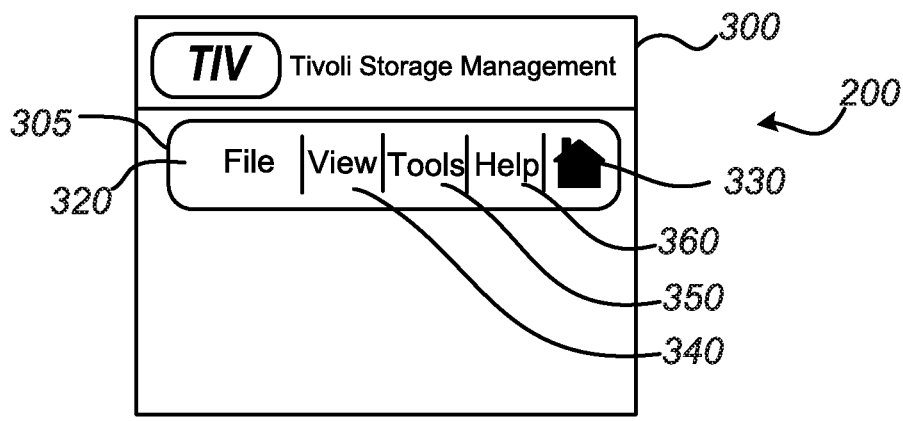
FIG. 5-FIG. 7 illustrate exemplary GUIs, according to embodiments of the present invention.
Figure 6:
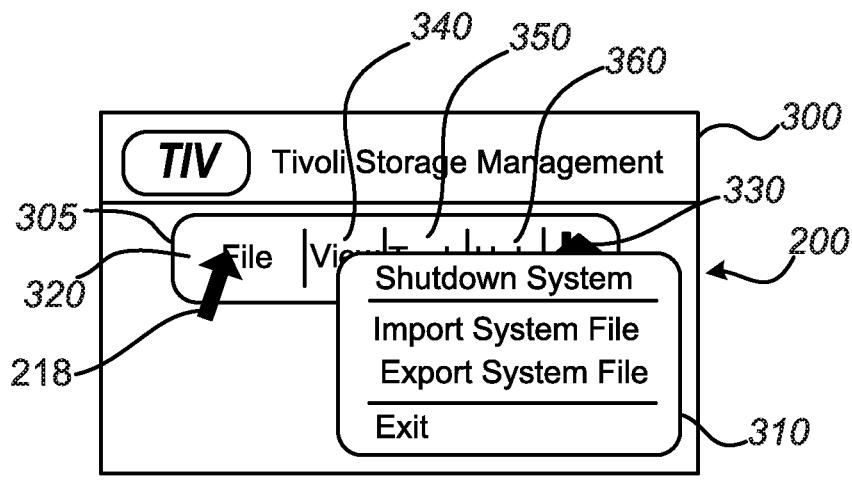

FIG. 5 illustrates an exemplary GUI 200 of an application 300, according to embodiments of the present invention. GUI 200 may include an interface comprising a menu 305 including an image object 330 and text objects 320, 340, 350, 360, etc. Application 300 may be utilized to manage a computing device 100, etc. such as a storage management server. FIG. 6 illustrates GUI 200 where a hover is triggered and hover section 310 is subsequently displayed. A hover may be triggered by the cursor 218 being positioned over a text object 204, an image object 206, etc. Hover display module 280 determines that a hover section is available for the associated text object 204, image object 206, etc. If the cursor 218 is positioned over a text object 204, image object 206, etc. and a hover section is available for the associated text object 204, image object 206, etc. a hover is triggered. Subsequent to a hover being triggered, hover display module 280 determines via the grace period module 282 the current grace period interval and instructs the GPU 172 to display the associated hover section upon the lapse of the grace period interval.

For example, as shown in FIG. 6, cursor 218 is positioned over text object 320. Hover display module 280 determines a hover is triggered since a hover section 310 that is associated with text object 320 may be displayed. Hover display module 280 determines the current grace period interval and instructs GPU 172 to display hover section 310 upon GUI 200 after the lapse of the current grace period interval. As shown in FIG. 6 the display of hover section 310 blocks the display of other objects within GUI 200 (e.g. image object 330 and text objects 340, 350, 360 are partially covered, etc.). Thus, according to various embodiments of the present invention, the grace period interval may be dynamically adjusted to better reflect a user's desire. For instance, the grace period interval may be increased if it is determined that the display of an associated hover section was not consistent with the intent of the user. The dynamic modification of the grace period interval is beneficial so that future hover sections may be displayed to better reflect the user's intent.

Figure 7:
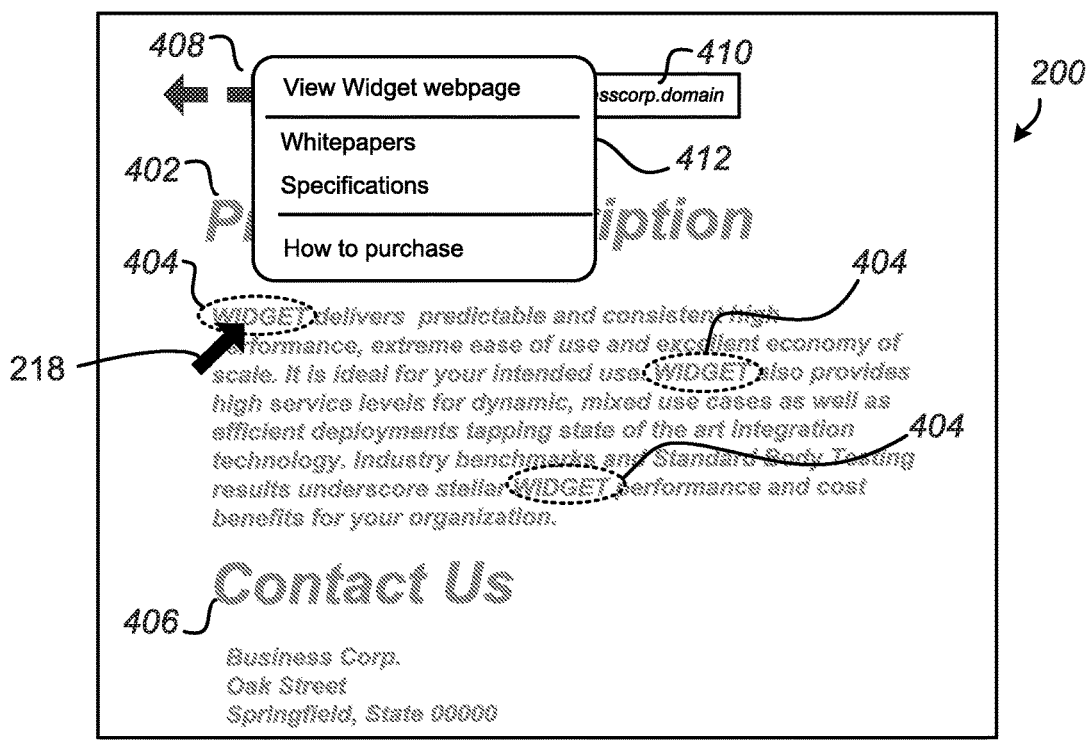

In another example, as shown in FIG. 7, cursor 218 is positioned over text object 404 within a GUI 200 that includes text objects 402, 404, 406, 410 and image object 408. Hover display module 280 determines a hover is triggered since a hover section 412 associated with text object 404 may be displayed. Hover display module 280 determines the current grace period interval and instructs GPU 172 to display hover section 412 upon GUI 200 after the lapse of the current grace period interval. As shown in FIG. 7 the display of hover section 412 blocks the display of other objects within GUI 200 (e.g. text objects 402, 410 and image object 408 are partially covered, etc.). The dynamic modification of the grace period interval to better reflect the user's intent is important, for example, since an important navigation object (i.e. image object 408) may become blocked by the display of hover section 412.

Figure 8:
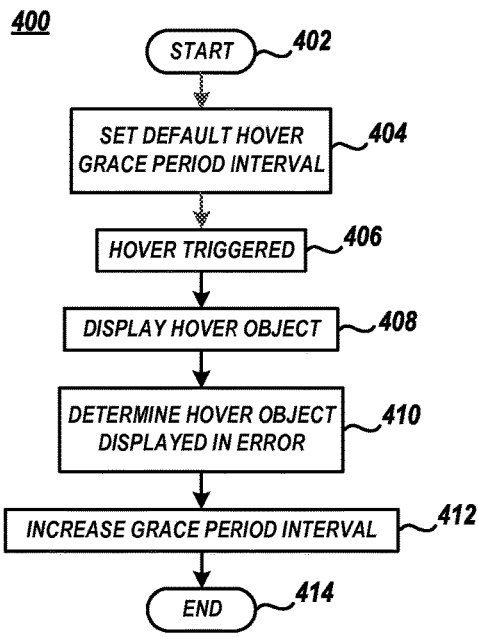
FIG. 8 illustrates an exemplary method for increasing a hover grace period interval, according to various embodiments of the present invention.

FIG. 8 illustrates an exemplary method 400 for dynamically increasing a hover grace period interval, according to various embodiments of the present invention. Method 400 may be utilized by e.g. hover display module 280 to manage or otherwise control the display of hover sections via GUI 200. Further, method 400 may be utilized to increase the hover grace period interval by generally tracking GUI 200 manipulations subsequent to the display of a hover section and increasing the hover grace period interval if the manipulations indicate the hover section was displayed in error.

Method 400 begins at block 402 and continues with setting a default hover grace period interval (block 404). For example, grace period module 282 sets an initial default grace period interval of 250 ms. The default grace period interval may be set at computer system 100 bring up (i.e. the default grace period interval may be hard coded). Alternatively, the default grace period interval may be set by a user of computer system 100.

Method 400 may continue with detecting that a hover has been triggered (block 406). Hover display module 280 may determine that a hover is triggered by determining that a hover section is available for an associated object (e.g. text object 204, image object 206, etc.) for which cursor 218 is positioned. In certain embodiments, hover display module 280 utilizes cursor module 284 to determine whether cursor 218 is positioned over an object. In certain embodiments, hover display module 280 queries application 124, CPU 106, GPU 172, etc. to determine whether the object has an available hover section associated therewith.

Method 400 may continue with displaying hover section (block 408). In certain embodiments, hover display module 280 displays the hover section associated with the object under which cursor 218 is positioned. If the hover section display is an initial display of a hover section, hover display module 280 may instruct GPU 172 to display the hover section after the initial default grace period interval has lapsed. Otherwise, hover display module 280 queries grace period module 282 to determine a current grace period interval and instructs GPU 172 to display the hover section after the current default grace period interval has lapsed.

Method 400 may continue with determining that the displayed hover section has been displayed in error (block 410). For example, hover display module 280 may receive input from cursor module 284, user manipulation module 288, etc. to determine that the displayed hover section was displayed inconsistent with the intent of the user (e.g. the user exits of closes the hover section soon after its display, etc.). Hover display module 280 may utilize other inputs as described further to determine the displayed hover section has been displayed in error.

Method 400 may continue with increasing the grace period interval if it has been determined the displayed hover section has been displayed in error (block 412). For example, grace period module 282 increases the grace period interval if hover display module 280 has determined the displayed hover section has been displayed in error. By dynamically increasing the grace period interval, future hover sections may be displayed to better reflect the user's intent. Method 400 ends at block 414.

Figure 9:
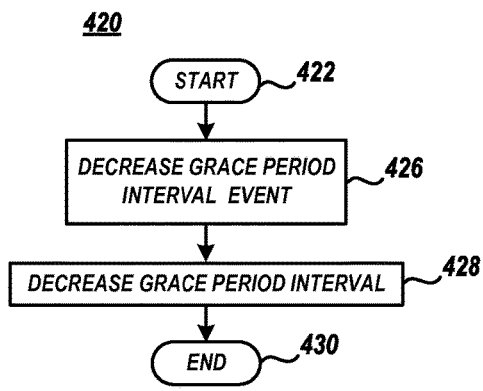
FIG. 9 illustrates an exemplary method for decreasing a hover grace period interval, according to various embodiments of the present invention.

FIG. 9 illustrates an exemplary method 420 for dynamically decreasing a hover grace period interval, according to various embodiments of the present invention. Method 420 may be utilized by e.g. hover display module 280 to manage or otherwise control the display of hover sections via GUI 200. Further, hover display module 280 may implement method 420 to counteract the monotonically increasing nature of the grace period interval of method 400. In certain embodiments, method 420 may be utilized to decrease the grace period interval to the default grace period interval overtime. Method 420 begins at block 422 and continues with detecting a decrease grace period event (block 426). For example, hover display module 280 may receive input from cursor module 284, user manipulation module 288, etc. to determine that the grace period interval be decreased (e.g. the user hovers over the same object within a threshold time, etc.). Hover display module 280 may utilize other inputs as described further to determine whether a decrease grace period interval event has occurred. Method 420 continues with decreasing the current grace period interval (block 428). For example, grace period module 282 decreases the grace period interval if hover display module 280 has detected a decrease grace period interval event. By dynamically decreasing the grace period interval, future hover sections may be displayed to better reflect the user's intent. Method 420 ends at block 430.

In certain embodiments, method 420 and method 400 occur in parallel. In various embodiments, method 420 may utilize a timer and a threshold, the expiration of such triggers a grace period interval reduction such that the grace period interval can gradually decrease normally over time without any action by the user. In certain embodiments, user actions may accelerate the grace period interval reduction. For example, interacting with the hover section itself (e.g., clicking a button or link within the hover section) might indicate that the user actually wanted the hover to show, so decreasing the grace period interval beneficial.

In certain embodiments, method 420 and method 400 work against each other and may be tuned to provide reasonable behavior to find an optimum setting for a user.

This may require us to put some further functionality to, for example, block 410, block 426, etc.

Figure 10:
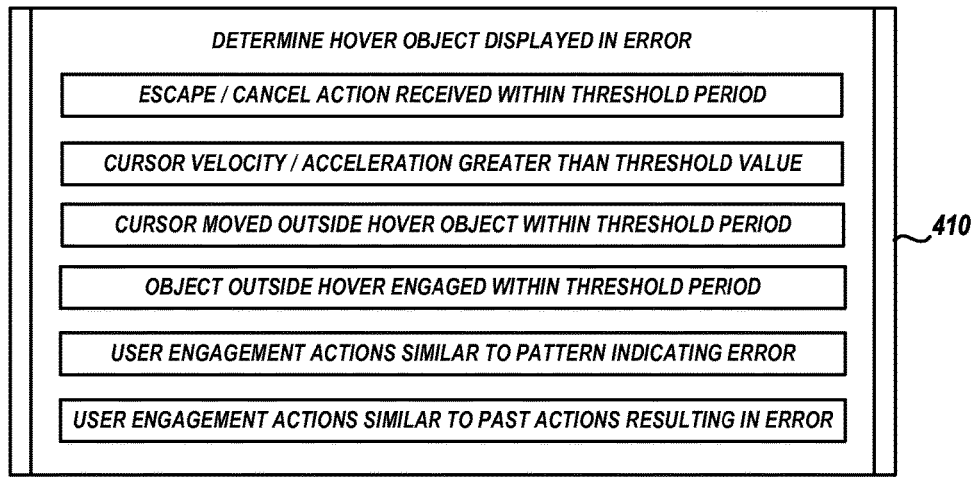
FIG. 10 illustrates exemplary modules to determine whether a hover section has been displayed in error and indicating that the hover grace period interval should be increased, according to various embodiments of the present invention.

FIG. 10 illustrates exemplary inputs that may be used to determine whether a hover section has been displayed in error, according to various embodiments of the present invention. For example, hover display module 280 tracks GUI 200 manipulations subsequent to the display of a hover section and determine whether those manipulations indicate the hover section was displayed in error. Hover display module 280 may utilize at least one input to determine the displayed hover section was displayed inconsistent with the intent of the user (block 410).

A particular input to determine whether a hover section has been displayed in error may be that e.g. manipulation module 288 determines an escape key of keyboard 134 is engaged within a threshold time following the display of the hover section. Another input may be that e.g. cursor module 284 determines a hover section close or exit object is manipulated by cursor 218 within via GUI 200 within a threshold time following the display of the hover section.

Yet another input may be that e.g. cursor module 284 determines cursor 218 is traversing at a velocity above a threshold value. Similarly, another input may be that e.g. cursor module 284 determines cursor 218 is accelerating above a threshold value. Yet another input may be that e.g. cursor module 284 determines cursor 218 traverses outside of the displayed hover section within a threshold time. Further, another input may be that e.g. manipulation module 288 detects that an object (e.g. and image object 204 or text object 206) exterior to the displayed hover section is engaged within a threshold time.

Even further, another input may be that e.g. cursor tracker 286 and/or manipulation module 288 determines that the traversal path of cursor 218 matches a path that is indicative of improper display of the hover section. Similarly, another input may be that e.g. cursor tracker 286 and/or manipulation module 288 determines that the traversal path of cursor 218 matches a previous path that resulted in the improper display of the hover section. Even further, input devices such as gyroscope, microphone, eye-tracker, etc. may allow a user to interact with system 100. Therefore, computer system 100 implementing method 400 may utilize such input devices to determine that e.g. an hover section is displayed in error.

In certain embodiments, if hover display module 280 receives any one of such inputs hover display module 280 instructs grace period module 282 to increase the grace period interval. In other embodiments, hover display module 280 may give greater weight to a particular input that is highly indicative of the improper display of the hover section (i.e. the hover section is closed within the threshold time, etc.) and lower weights to other inputs that may be more speculative in order to determine with the hover section was displayed in error. In further embodiments, hover display module 280 may need to receive above a threshold number of inputs that are indicative of the improper display of the hover section to determine that the hover section was displayed in error. For example, two inputs must be received by hover display module 280 for an affirmative determination that the hover section was displayed in error.

Figure 11:
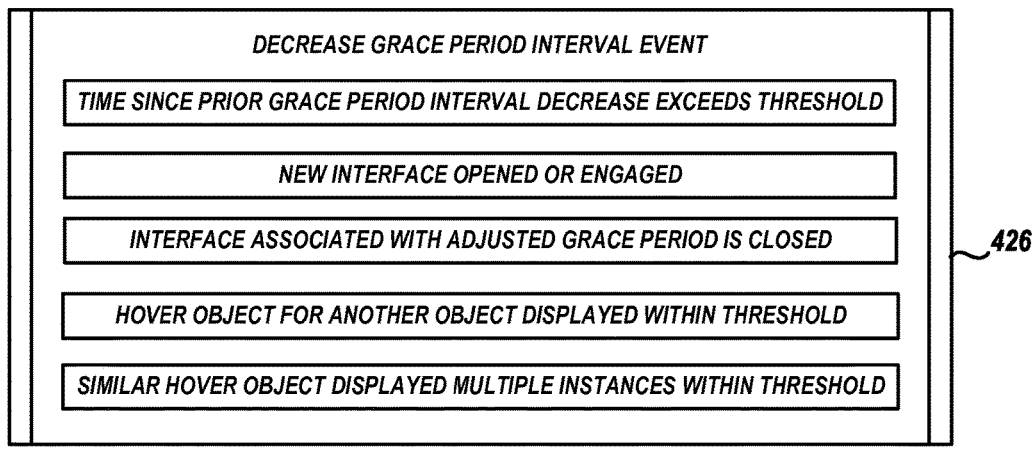
FIG. 11 illustrates exemplary modules to determine whether the hover grace period interval should be decreased, according to various embodiments of the present invention.

FIG. 11 illustrates exemplary inputs used to determine whether the hover grace period interval should be decreased, according to various embodiments of the present invention. For instance, hover display module 280 may utilize at least one input to determine a decrease grace period interval event (block 426).

A particular input used to determine whether the hover grace period interval should be decreased is a time since a prior grace period interval decrease exceeds a threshold. For example, hover display module 280 may maintain a timer or clock and may decrease the current grace period interval after a threshold time until the current grace period equals the default grace period interval.

Another particular input used to determine whether the hover grace period interval should be decreased is that a new GUI 200 is opened, engaged, or is otherwise activated. For example, cursor module 284 may determine a previously deactivated GUI 200 has been activated (a lower level GUI 200 is selected and fully displayed, a new GUI 200 instance may be displayed, etc.) and instructs hover display module 280 and/or grace period module 282 to decrease the current grace period interval. In certain embodiments, if the new GUI 200 that is opened or activated is highly similar to a previous GUI 200, the grace period interval may not be decreased.

Similarly, another particular input used to determine whether the hover grace period interval should be decreased is that the GUI 200 that is associated with the current grace period is closed or otherwise deactivated. For example, cursor module 284 may determine the GUI 200 having a grace period interval greater than the default has been deactivated (a lower level GUI 200 is selected and fully displayed, the GUI 200 instance may is closed, the user has logged out of the GUI 200 session, etc.) and instructs hover display module 280 and/or grace period module 282 to decrease the current grace period interval.

Further, another particular input used to determine whether the hover grace period interval should be decreased is that a second hover section for a different object is displayed within a threshold after the display of the first hover section. Yet further, another particular input used to determine whether the hover grace period interval should be decreased is that the same hover section is repeatedly displayed within a threshold.

In certain embodiments, if hover display module 280 receives any one of such inputs indicating that the hover grace period interval should be decreased hover display module 280 instructs grace period module 282 to decrease the grace period interval. In certain embodiments, hover display module 280 may need to receive above a threshold number of inputs that are indicative that the hover grace period interval should be decreased. For example, two inputs must be received by hover display module 280 in order to instruct grace period module 282 to decrease the grace period interval.

Figure 12:
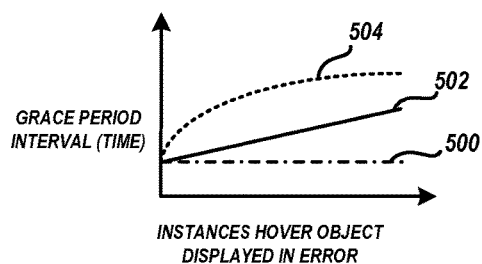
FIG. 12 illustrates exemplary hover grace period interval increase schemes, according to various embodiments of the present invention.

FIG. 12 illustrates exemplary hover grace period interval increase schemes, according to various embodiments of the present invention. Grace period module 282 may increase the grace period interval from the default in a variety of ways. For example, grace period module 282 may increase the grace period interval from a default (line 500) linearly as shown by line 502 such that a similar time is added for each instance it is determined that the hover section is displayed in error. In another example, grace period module 282 may increase the grace period interval from default (line 500) asymptotically to a maximum value as shown by line 504. In certain embodiments, a maximum grace period interval is set by e.g. hover display module 280. In such embodiments, the current grace period interval is not increased if it equals the maximum grace period interval. Even further, computer system 100 implementing method 420 may utilize such as gyroscope, microphone, eye-tracker, etc. to determine to reduce the hover grace period.

Figure 13:
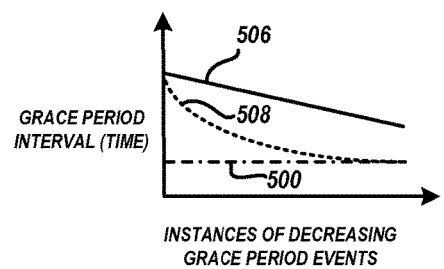
FIG. 13 illustrates exemplary hover grace period interval decrease schemes, according to various embodiments of the present invention.

FIG. 13 illustrates exemplary hover grace period interval decrease schemes, according to various embodiments of the present invention. Grace period module 282 may further decrease the grace period interval from the current value in a variety of ways. For example, grace period module 282 may decrease the grace period interval from a current grace period interval linearly as shown by line 506 such that a similar time is decreased for each instance the grace period interval is reduced. In another example, grace period module 282 may decrease the grace period interval from the current asymptotically to the default grace period interval (line 500) as shown by line 508. In various embodiments, grace period module 282 may utilize similar schemes (e.g. asymptotically increase and asymptotically decrease) to adjust the grace period interval. In other embodiments, grace period module 282 may utilize different schemes (e.g. linear increase and asymptotically decrease) to adjust the grace period interval.

In various embodiments, the grace period interval may be increased and decreased dynamically as is indicated or otherwise determined. For example, method 400 and method 420 may be implemented simultaneously to achieve a dynamically adjusted hover grace period interval.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method for dynamically adjusting a hover grace period interval, the method comprising:
    displaying, with a processor, a graphic user interface (GUI) by the processor manipulating pixels upon a screen;
    setting, with the processor, a default initial static hover grace period interval;
    displaying, with the processor, an initial hover section in the GUI as a result of receiving an initial manipulation of a first hover object displayed in the GUI, following the lapse of the default initial static hover grace period;
    tracking, with the processor, ensuing manipulations of the GUI following the display of the initial hover section to maintain a dynamic hover grace period interval, in order to reduce clutter of displayed hover sections in the GUI, by increasing the dynamic hover grace period interval from the default initial static hover grace period interval when the processor determines that the display of the initial hover section in the GUI was in error and invasive due to the initial hover section obscuring at least a portion of the GUI, wherein the processor sets a first instance of the dynamic hover grace period interval as the default initial static hover grace period interval plus a first time period when the processor tracks a first ensuing GUI manipulation to move the GUI cursor from inside of the displayed initial hover section to outside of the displayed initial hover section and wherein the processor sets a second instance of the dynamic hover grace period interval as the first dynamic hover grace period interval plus a second time period when the processor tracks a second ensuing GUI manipulation to close the displayed initial hover section within a predetermined close hover section time threshold from the display of the initial hover section, wherein the processor sets a third instance of the dynamic hover grace period interval as the second dynamic hover grace period interval plus a third time period when the processor tracks a third ensuing GUI manipulation to move the GUI cursor above a velocity threshold, and wherein the first time period equals the second time period;
    tracking, with the processor, ensuing manipulations of the GUI following the display of the initial hover section to further maintain the dynamic hover grace period interval by decreasing the dynamic hover grace period interval when the processor detects a threshold number of dynamic hover grace period interval decrease events, wherein the dynamic hover grace period interval decrease events comprise:
        detecting multiple successive displays of the initial hover section in the GUI within a predetermined same hover section successive display time threshold;
        detecting a lapse of a predetermined decrease grace period time threshold since a most recent decrease of the dynamic hover grace period interval without an intervening increase of the dynamic hover grace period interval;
        receiving a GUI deactivation manipulation of the GUI that deactivates the GUI;
        displaying a different hover section-from the initial hover section in the GUI within a predetermined different hover section display time threshold from the display of the initial hover section; and
        displaying a different hover section-from the initial hover section in the GUI within a predetermined different hover section display time threshold from the display of the initial hover section;
    detecting, with the processor, a subsequent manipulation of a subsequent hover object;
    determining, with the processor, a current dynamic hover grace period interval; and
    displaying, with the processor, a subsequent hover section associated with the subsequent hover object following the lapse of the current dynamic hover grace period interval.

2. The method of claim 1, wherein the processor sets a fourth instance of the dynamic hover grace period interval as the third dynamic hover grace period interval plus a fourth time period when the processor tracks a fourth ensuing GUI manipulation to accelerate the GUI cursor above an acceleration threshold.

3. The method of claim 1, wherein the processor sets a fourth instance of the dynamic hover grace period interval as the third dynamic hover grace period interval plus a fourth time period when the processor tracks a fourth ensuing GUI manipulation to engage a GUI object that is displayed outside of the displayed initial hover section.

4. The method of claim 1, wherein the processor sets a fourth instance of the dynamic hover grace period interval as the third dynamic hover grace period interval plus a fourth time period when the processor tracks an ensuing pattern of GUI manipulations that match a predetermined pattern of GUI manipulations that indicate the initial hover section was displayed in error.

5. The method of claim 1, wherein the third time period is greater than the first time period.

6. The method of claim 1, wherein the threshold number of dynamic hover grace period interval decrease events is two or more.

7. The method of claim 1, wherein the threshold number of dynamic hover grace period interval decrease events is three or more.

* * * * *